US012641095B2

(12) United States Patent
Wang et al.

(10) Patent No.: US 12,641,095 B2
(45) Date of Patent: \*May 26, 2026

(54) RISK ASSESSMENT FOR NETWORK ACCESS CONTROL THROUGH DATA ANALYTICS

(71) Applicant: CyberArk Software Ltd., Petach-Tikva (IL)

(72) Inventors: Yanlin Wang, Cupertino, CA (US); Weizhi Li, San Jose, CA (US)

(73) Assignee: CyberArk Software Ltd., Petach-Tikva (IL)

( \* ) Notice: Subject to any disclaimer, the term of this patent is extended or adjusted under 35 U.S.C. 154(b) by 43 days.

This patent is subject to a terminal disclaimer.

(21) Appl. No.: 18/749,324

(22) Filed: Jun. 20, 2024

(65) Prior Publication Data

US 2024/0422177 A1 Dec. 19, 2024

Related U.S. Application Data

(63) Continuation of application No. 17/242,707, filed on Apr. 28, 2021, now Pat. No. 12,047,392, which is a (Continued)

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01); *H04L 63/08* (2013.01); (Continued)

(58) Field of Classification Search
CPC .................................................. H04L 63/1416
See application file for complete search history.

(56) References Cited

U.S. PATENT DOCUMENTS 5,699,403 A 12/1997 Ronnen
6,282,546 B1 8/2001 Gleichauf et al.
(Continued)

FOREIGN PATENT DOCUMENTS

WO WO 9956195 A1 11/1999

OTHER PUBLICATIONS

Non-Final Rejection for U.S. Appl. No. 17/242,707, 12 pages, Notification Date: Oct. 2, 2023. (Year: 2023).\*

(Continued)

*Primary Examiner* — Ponnoreay Pich
(74) *Attorney, Agent, or Firm* — FINNEGAN, HENDERSON, FARABOW, GARRETT & DUNNER LLP

(57) ABSTRACT

Methods and systems of risk assessment for network access control through data analytics. An embodiment of the invention employs well-known machine-learning clustering methods to learn normal entity behavior by looking for patterns in the events that stream in continuously. In an embodiment of the invention, normal entity behaviors are represented as clusters of event vectors. An embodiment of the invention evaluates the risk level for a new event of an entity by comparing the event with the entity's profile represented as clusters of event vectors. In an embodiment of the invention, the risk level is associated with a confidence level. Confidence level indicates how well the system knows about the entity. Embodiments of the invention do not need human administration in the process of building entity profile and assessing risk level of events associated with an entity.

20 Claims, 5 Drawing Sheets

Related U.S. Application Data continuation of application No. 15/785,430, filed on Oct. 17, 2017, now abandoned.

(52) U.S. Cl.
CPC ...... *H04L 63/1425* (2013.01); *H04L 63/1433* (2013.01); *H04L 63/205* (2013.01)

(56) References Cited

U.S. PATENT DOCUMENTS

| | | | |
|---|---|---|---|
| 7,480,715 B1 | 1/2009 | Barker et al. | |
| 8,418,249 B1 * | 4/2013 | Nucci | G06F 21/552 |
| | | | 709/225 |
| 9,501,647 B2 | 11/2016 | Yampolskiy et al. | |
| 10,594,710 B2 * | 3/2020 | Wright | G06N 7/01 |
| 10,673,880 B1 * | 6/2020 | Pratt | H04L 63/1425 |
| 12,047,392 B2 * | 7/2024 | Wang | G06N 20/00 |
| 2002/0143938 A1 * | 10/2002 | Alexander | H04L 41/22 |
| | | | 709/224 |
| 2002/0147803 A1 | 10/2002 | Dodd et al. | |
| 2003/0009696 A1 | 1/2003 | Bunker, V et al. | |
| 2003/0037063 A1 | 2/2003 | Schwartz | |
| 2003/0050718 A1 | 3/2003 | Tracy et al. | |
| 2003/0070003 A1 | 4/2003 | Chong et al. | |
| 2003/0154393 A1 * | 8/2003 | Young | G06Q 10/10 |
| | | | 726/25 |
| 2003/0233567 A1 | 12/2003 | Lynn et al. | |
| 2004/0098610 A1 | 5/2004 | Hrastar | |
| 2004/0143753 A1 | 7/2004 | Hernacki et al. | |
| 2005/0050351 A1 | 3/2005 | Cain | |
| 2005/0097339 A1 | 5/2005 | Wiley et al. | |
| 2006/0085854 A1 * | 4/2006 | Agrawal | H04L 63/1408 |
| | | | 726/23 |
| 2006/0156407 A1 | 7/2006 | Cummins | |
| 2006/0187847 A1 | 8/2006 | Pelton et al. | |
| 2006/0282660 A1 * | 12/2006 | Varghese | G07F 7/1083 |
| | | | 713/155 |
| 2009/0089869 A1 * | 4/2009 | Varghese | G07F 7/1008 |
| | | | 726/7 |
| 2009/0265777 A1 * | 10/2009 | Scott | H04L 63/1441 |
| | | | 726/11 |
| 2012/0180124 A1 | 7/2012 | Dallas et al. | |
| 2013/0097701 A1 * | 4/2013 | Moyle | H04L 63/1416 |
| | | | 726/22 |
| 2013/0144888 A1 | 6/2013 | Faith et al. | |
| 2013/0167238 A1 | 6/2013 | Russell et al. | |
| 2013/0298244 A1 * | 11/2013 | Kumar | G06F 21/51 |
| | | | 726/25 |
| 2014/0041028 A1 * | 2/2014 | Ramsey | G06F 21/316 |
| | | | 726/22 |
| 2014/0068775 A1 | 3/2014 | Ward et al. | |
| 2015/0324559 A1 | 11/2015 | Boss et al. | |
| 2015/0373043 A1 * | 12/2015 | Wang | G06F 21/6254 |
| | | | 706/12 |
| 2016/0065604 A1 * | 3/2016 | Chen | G06F 21/6227 |
| | | | 726/23 |
| 2016/0140561 A1 | 5/2016 | Cowan | |
| 2016/0156655 A1 * | 6/2016 | Lotem | H04L 63/1416 |
| | | | 726/23 |
| 2016/0226901 A1 * | 8/2016 | Baikalov | H04L 63/1425 |
| 2016/0277424 A1 * | 9/2016 | Mawji | G06Q 50/01 |
| 2016/0323243 A1 * | 11/2016 | LeVasseur | G06N 20/00 |
| 2016/0352765 A1 * | 12/2016 | Mermoud | H04L 63/1458 |
| 2018/0091540 A1 | 3/2018 | Solow et al. | |
| 2018/0113951 A1 | 4/2018 | Tanner | |
| 2018/0152471 A1 | 5/2018 | Jacobsson | |
| 2018/0198812 A1 * | 7/2018 | Christodorescu | H04L 63/1425 |
| 2018/0219891 A1 | 8/2018 | Jain | |
| 2018/0246762 A1 | 8/2018 | Tarsa et al. | |
| 2018/0248863 A1 | 8/2018 | Kao et al. | |
| 2019/0081968 A1 * | 3/2019 | Wang | H04L 63/102 |
| 2019/0116193 A1 * | 4/2019 | Wang | H04L 63/08 |
| 2019/0306170 A1 * | 10/2019 | Wang | H04L 63/20 |

OTHER PUBLICATIONS

"Vector—Wikipedia", no author, 5 pages, printed Oct. 22, 2020. (Year: 2020).

* cited by examiner

RISK ASSESSMENT FOR NETWORK ACCESS CONTROL THROUGH DATA ANALYTICS

This application is a continuation of U.S. utility application Ser. No. 17/242,707, filed Apr. 28, 2021, which is a continuation of U.S. utility application Ser. No. 15/785,430 filed Oct. 17, 2017, the contents of which are both incorporated here by reference in their entirety.

FIELD OF THE DISCLOSURE

This disclosure relates generally to Internet security and, more particularly, to methods and systems of risk assessment for network access control through data analytics.

BACKGROUND

Authentication and authorization are security means to protect a computer network from unauthorized access to its resources such as computer servers, software applications and services, and so on. Authentication verifies the identity of an entity (person, user, process, or device) that wants to access a computer network resources. In the rest of this disclosure, terms of an entity, a person, a process, a user and a device will be used interchangeably. Common ways for authentication are username/password combination, fingerprint readers, retinal scans, etc. On the other hand, authorization determines what privileges that an authenticated entity has during the entity's session from log-on until log-off. The privileges assigned to an entity define the entity's access right to the network resources. For example, an entity may only be able to read documents but not allowed to edit documents.

Multifactor authentication (MFA) as an enhancement of identity authentication increases security by requiring two or more different authentication methods such as a user/password combination followed by an SMS request to the user's cell phone to confirm the user's identity. However, MFA increases the authentication security at the cost of increased complexity of the network login process for a user. A user has to perform multiple authentications, sometimes on different devices, to get authenticated.

As a result, adaptive MFA has been developed to ease the use of MFA. A network with adaptive MFA can change its authentication requirements depending on detected conditions at log-in. Adaptive MFA is rule-based, though, which limits its effectiveness because those rules are static. In addition, adaptive MFA only act on the conditions at the time of a user's login without considering the user's past network access and usage history. Therefore, adaptive MFA cannot determine if the user's current login activity is normal or abnormal.

SUMMARY OF THE INVENTION

Embodiments of the invention build an entity profile by collecting and analyzing the entity's events in real time using well-known machine-learning methods. Each event of an entity that is collected and analyzed by an embodiment of the invention includes event attributes such as entity ID, login location, login date, login time, device used at login, IP address used at login, application launched after login, and so on.

An embodiment of the invention employs well-known machine-learning clustering methods to learn normal entity behavior by looking for patterns in the events that stream in continuously. In an embodiment of the invention, normal entity behaviors are represented as clusters of event vectors. An embodiment of the invention evaluates the risk level for a new event of an entity by comparing the event with the entity's profile represented as clusters of event vectors. In an embodiment of the invention, the risk level is associated with a confidence level. Confidence level indicates how well the system knows about the entity. This confidence level is initially low and increases over time when more events of the entity are collected and analyzed.

Embodiments of the invention do not need human administration in the process of building entity profile and assessing risk level of events associated with an entity. An entity's profile in the form of clusters of event vectors evolves autonomously while events are continuously received and clustered by an embodiment of the invention. In an embodiment of the invention, rules for triggering risk assessment of an event associated with an entity is automatically updated. The update is based on the events that are resulted from the risk assessment on prior events associated the entity. Therefore, embodiments of the invention are much easier to operate than prior arts, which require human administration.

BRIEF DESCRIPTION OF DRAWINGS

Embodiments of the invention are illustrated by way of example and not by way of limitation in the figures of the accompanying drawings in which like references indicate similar elements. Note that references to "an" or "one" embodiment in this disclosure are not necessarily to the same embodiment, and such references mean "at least one."

DETAILED DESCRIPTION OF THE INVENTION

Figure 1:
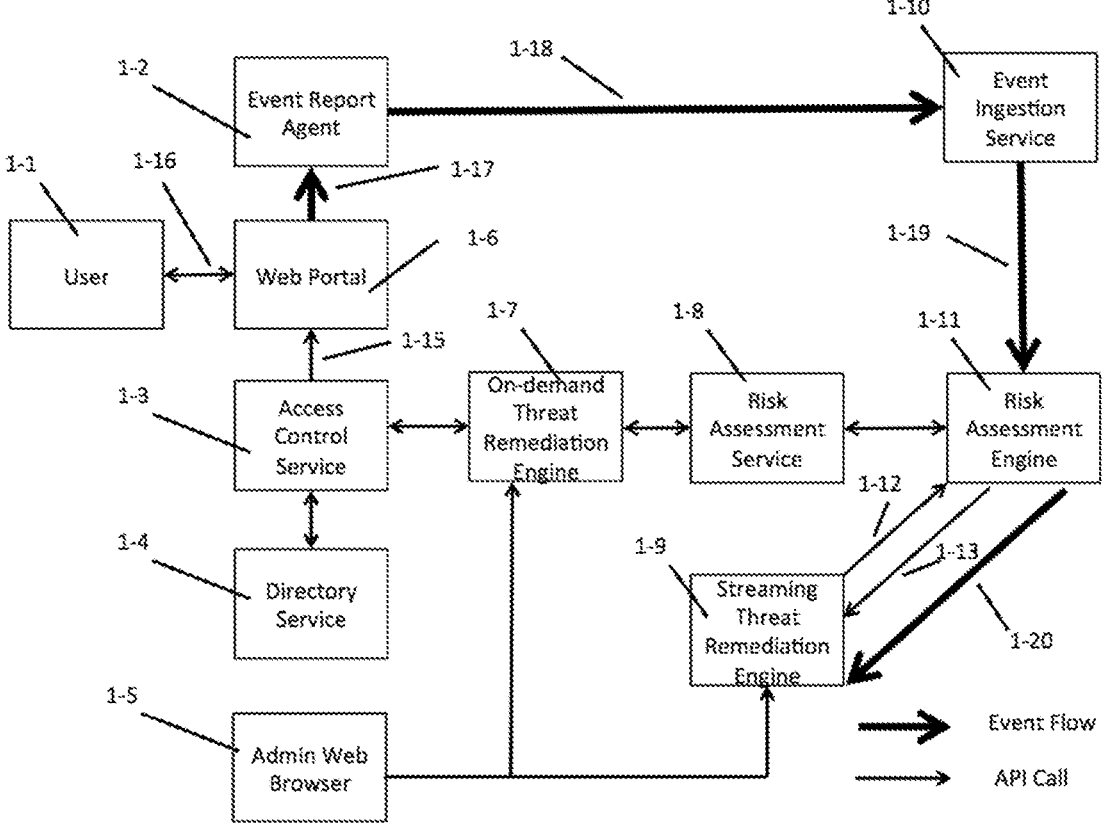
FIG. 1 is a block diagram that shows the components of an embodiment of the invention as they exist in a web portal within a computer network, or other computing environment that requires authentication and authorization to use the environment's resources. The diagram shows possible event flows through the invention with thick arrows, and shows possible communication among components via API calls with thin arrows.

FIG. 1 shows the components of an embodiment of the invention as they exist in a web portal within a computer network, or other computing environment that requires authentication and authorization to use the environment's resources.

An event reporting agent 1-2 within the environment detects entity behavior and reports it to an embodiment of the invention as events, each event with a set of attributes and can include:

Login events, which can include parameters such as the IP address of the device used, the type of device used, physical location, number of login attempts, date and time, and more.

Application access events, which can specify what application is used, application type, date and time of use, and more.

Privileged resource events such as launching a Secure Shell (SSH) session or a Remote Desktop Protocol (RDP) session as an administrator.

Mobile device management events such as enrolling or un-enrolling a mobile device with an identity management service.

CLI command-use events such as UNIX commands or MS-DOS commands, which can specify the commands used, date and time of use, and more.

Authorization escalation events, such as logging in as a super-user in a UNIX environment, which can specify login parameters listed above.

Risk feedback events, which report an embodiment of the invention's evaluations of the entity. For example, when the access control service 1-3 requests a risk evaluation from an embodiment of the invention at entity login, the action generates an event that contains the resulting evaluation and any resulting action based on the evaluation.

An access control service 1-3 authenticates entities and can change authentication factor requirements at login and at other authentication events.

A directory service 1-4 such as Active Directory defines authentication requirements and authorization for each entity.

An admin web browser 1-5 that an administrator can use to control an embodiment of the invention.

An event ingestion service 1-10 accepts event data from the event reporting agent, filters out events that are malformed or irrelevant, extracts necessary attributes from event data, and converts event data into values that a risk assessment engine 1-11 can use.

The risk assessment engine 1-11 accepts entity events from the event ingestion service 1-10 and uses them to build an entity profile for each entity. Whenever requested, the risk assessment engine 1-11 can compare an event or attempted event to the entity's profile to determine a threat level for the event.

A streaming threat remediation engine 1-9 accepts a steady stream of events from the risk assessment engine 1-11. The streaming threat remediation engine 1-9 stores a rule queue. Each rule in the queue tests an incoming event and may take action if the rule detects certain conditions in the event. A rule may, for example, check the event type, and contact the risk assessment engine to determine risk for the event.

A risk assessment service 1-8 is a front end for the risk assessment engine 1-11. The service 1-8 allows components outside the invention's core to make authenticated connections and then request service from the risk assessment engine 1-11. Service is typically something such as assessing risk for a provided event or for an attempted event such as login.

An on-demand threat remediation engine 1-7 is very similar to the streaming threat remediation engine 1-9. It contains a rule queue. The rules here, though, test attempted events such as log-in requests or authorization changes that may require threat assessment before the requests are granted and the event takes place. An outside component such as the access control service 1-3 may contact the on-demand threat remediation engine 1-7 with an attempted event. The on-demand threat remediation engine 1-7 can request risk assessment from an embodiment of the invention through the risk assessment service 1-8.

In an embodiment, a user attempts to log into an application at a web portal. The Event Reporting Agent 1-2 captures the user activity, records it as an event, which consists of event attributes such as user log in time, location latitude, location longitude, etc. The Event Report Agent 1-2 forwards the event to the Event Ingestion Service 1-10. The Event Ingestion Service 1-10 filters out some of the event attributes before converting the rest of the event attributes to numeric values, and each event is now represented as an n-tuple vector, where n is the number of event attributes. In other words, each event attribute is encoded as a single value. In an embodiment, an event attribute may be encoded as a multi-dimension vector. The Event Ingestion Service 1-10 then forwards the formatted event vector to the Risk Assessment Engine.

The Risk Assessment Engine 1-11 uses well-known machine learning clustering algorithms, e.g., K-Means, to determine if the event is part of any existing event cluster or user profile cluster in real time. The user profile cluster is updated by adding the event vector into the cluster determined by the well-known clustering algorithm. The Risk Assessment Engine 1-11 then forwards the event to the Streaming Threat Remediation Engine 1-9.

In an embodiment, the Risk Assessment Engine 1-11 applies configurable machine learning rules to run the well-known machine learning clustering algorithms, e.g., K-Means, to determine if the event is part of any existing event cluster or user profile cluster. In an embodiment, machine learning rules guide the machine learning process within the Risk Assessment Engine 1-11, e.g., how to select dimensions in an event vector to be fed into the well-known machine learning algorithm, whether and how to transform the selected dimensions based event type, how to set the weight of each selected dimension in an event vector, and which machine learning algorithm to run, etc.

In an embodiment, machine learning rules can be inherited and overwritten. The Risk Assessment Engine 1-11 has default system-level machine learning rules, which can be inherited by tenant companies and individual users. On the other hand, different tenant companies can customize their own company-level machine learning rules, which overwrite the default system-level machine learning rules. Similarly, different users can have different individual machine learning rules, which override company-level machine learning rules.

The risk assessment engine 1-11 may use the risk and confidence scores to assign one of five fraud risk levels to the assessed event:

Unknown: there are not enough events in the entity profile over a long enough period of time to successfully determine fraud risk.

Normal: the event looks legitimate.

Low Risk: some aspects of the event are abnormal, but not many.

Medium Risk: some important aspects of the event are abnormal while some are not.

High Risk: many key aspects of the event are abnormal.

In an embodiment, the Risk Assessment Engine 1-11 computes a risk score of the event based on the vector distance between the event vector and the cluster center vector in an n-dimension vector space, where n is the number of event attributes. In other words, each event attribute is encoded as a single value. In an embodiment, an event attribute may be encoded as a multi-dimension vector. Risk Score indicates how distinct the requested identity activity in the form of an event is from the user's normal behavior in the form of the user profile cluster. In an embodiment, the range of Risk Score is (0, 100], where 100 denotes the highest risk score, and O denotes the lowest risk score.

In an embodiment, the Risk Assessment Engine 1-11 applies configurable risk assessment rules to compute risk scores. In an embodiment, risk assessment rules can be inherited and overwritten. The Risk Assessment Engine 1-11 has default system-level risk assessment rules, which can be inherited by tenant companies and individual users. On the other hand, different tenant companies can configure their own company-level risk assessment rules, which overwrite the default system-level risk assessment rules. Similarly, different users can be configured with different individual risk assessment rules, which override company-level risk assessment rules.

Associated with a risk score, the Risk Assessment Engine 1-11 also computes a confidence score. Confidence Score indicates how well the system knows about the user. This score is initially low and increases over time as the Risk Assessment Engine 1-11 receives and learns more event data of the user.

In an embodiment, the Confidence Score is calculated by a customized sigmoid function based on number of data points and period of time (e.g., in days) learned by the Risk Assessment Engine 1-11. In an embodiment, the range of Confidence Score is (0, 100], where 100 denotes the highest confidence score, and 0 denotes the lowest confidence score.

Before the Risk Assessment Engine 1-11 is able to compute a risk score with certain confidence for an event related to a user, a training period is needed, where the Risk Assessment Engine 1-11 collects and constructs the user profile, i.e., event cluster based on the received events during this period.

The Risk Assessment Engine 1-11 runs pre-configured rules against the event and determines if the event requires any risk assessment. The rules are a set of conditions, e.g., condition 1: the user tries to log into a critical Human Resources application that can view all the employees' personal information; condition 2: the user's device type is changed since last successful log; etc.

In an embodiment, the Streaming Threat Remediation Engine 1-9 determines the risk level of a network access event based on received risk score and confidence score as well as current risk thresholds and confidence thresholds. The event vector and the determined risk level information together as a user profile record is stored into a model repository by the Streaming Threat Remediation Engine 1-9. In an embodiment, the user profile record stored in the model repository is used by the system to trigger alerts based on event risk levels. In an embodiment, if the event is assessed with high fraud risk level, an alert email or SMS text message is automatically generated to notify the user. In case of network fraud, the user can take actions such as contacting customer service to evict the unauthorized network access. In an embodiment, if the event is assessed with high fraud risk level, system administrators receive an alert message, and take actions such as contacting the user for network access verification.

In an embodiment, the Streaming Threat Remediation Engine 1-9 applies configurable risk assessment rules to compute risk level. In an embodiment, risk assessment rules can be inherited and overwritten. The Streaming Threat Remediation Engine 1-9 has default system-level risk assessment rules, which can be inherited by tenant companies and individual users. On the other hand, different tenant companies can configure their own company-level risk assessment rules, which overwrite the default system-level risk assessment rules. Similarly, different users can configure different individual risk assessment rules, which override company-level risk assessment rules.

In an embodiment, the on-demand threat remediation engine 1-7 adjusts risk thresholds and confidence thresholds based on risk feedback events, which are resulted from the risk level assessment of prior events. The on-demand threat remediation engine 1-7 determines the risk level of a network access event or attempt based on the received risk score and confidence score as well as current risk thresholds and confidence thresholds. If the access event or attempt is assessed with high fraud risk, the on-demand threat remediation engine 1-7 sends an instruction to the Access Control Service 1-3 to request user for additional authentication with alternative authentication method. Alternatively, block the access depending on the policy set by a security admin on the Access Control Service 1-3. The instruction from the on-demand threat remediation engine 1-7 to the Access Control Service 1-3 generates a risk feedback event that contains the risk level evaluation by the on-demand threat remediation engine 1-7, and any resulting action triggered by the risk level evaluation such as the authentication of user's additional login attempt using alternative authentication method. The authentication results contained in such risk feedback events are fed back from the Event Report Agent 1-2 to the on-demand threat remediation engine 1-7 via Event Ingestion Service 1-10, Risk Assessment Engine 1-11 and Risk Assessment Service 1-8. The on-demand threat remediation engine 1-7 analyzes the received authentication results contained in risk feedback events, and determines if the risk thresholds and confidence thresholds need to be adjusted. For example, if all of the authentication results are positive, i.e., all users are authenticated successfully using alternative authentication method, the risk thresholds and/or confidence thresholds may need to be set higher to prevent unnecessary additional authentication requests.

In an embodiment, the on-demand threat remediation engine 1-7 applies configurable risk assessment rules to compute risk level. In an embodiment, risk assessment rules can be inherited and overwritten. The on-demand threat remediation engine 1-7 has default system-level risk assessment rules, which can be inherited by tenant companies and individual users. On the other hand, different tenant companies can customize their own company-level risk assessment rules, which overwrite the default system-level risk assessment rules. Similarly, different users can be configured with different individual risk assessment rules, which override company-level risk assessment rules.

Figure 2:
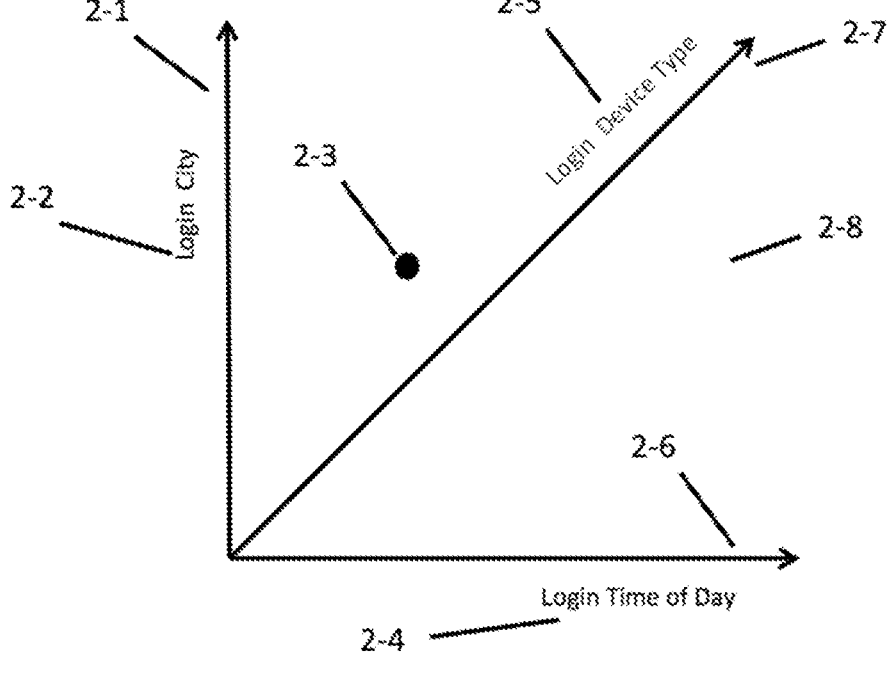
FIG. 2 shows an event in form of a three-tuple vector in a three dimensional entity profile vector space, where X axis is event's login time of day, Y axis is event's login city, and Z axis is event's login device type.

FIG. 2 shows an event represented as 3-tuple vector 2-3 in a three dimensional entity profile vector space 2-8, where X axis 2-6 is event's login time of day 2-4, Y axis 2-1 is event's login city 2-2, and Z axis 2-7 is event's login device type 2-5.

Figure 3:
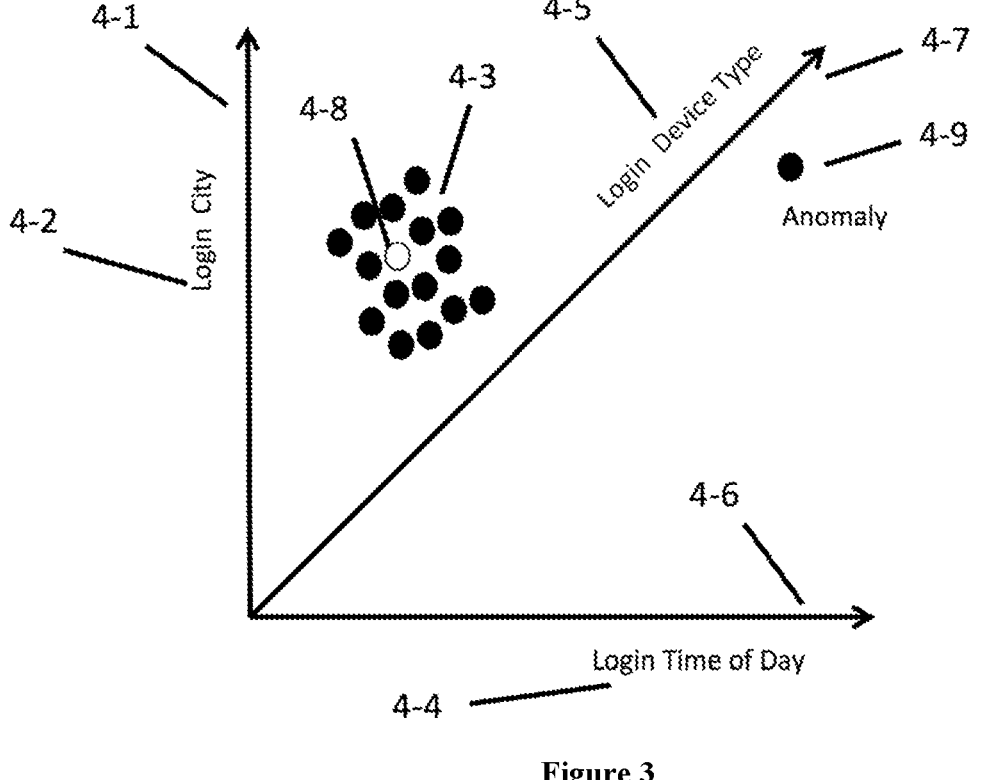
FIG. 3 is a diagram of an entity profile in form of an event cluster, an anomaly event in form of an event vector, and a normal event in form of an event vector, which is the first event vector of a new event cluster.

As more and more events are collected, the event cluster is growing and expanding. FIG. 3 is a diagram of an entity profile in form of an event cluster 4-3, an anomaly event in form of an event vector 4-9. The well-known machine learning clustering algorithm keeps updating the cluster while new event vectors are received and added into the entity profile vector space.

In an embodiment of the invention, as the center of a user's event cluster is dynamically updated, the risk score of a new event is also dynamically adjusted. For example, the previous cluster center is represented as (8 AM, city A, iPhone), and the new cluster center is represented as (8:30 AM, city A, iPhone). In terms of the login time of day, if the new event is not within 30 minutes distance from the cluster center, the event is considered with high risk, i.e., it will be assigned with a high risk score. For a new event (8:59 AM, city A, iPhone), the risk score is low with the new cluster center because it is within 30 minutes distance from the new cluster center. However, the new event's risk score would be high with the previous cluster center as the distance between the new event and the previous cluster center is not within 30 minutes. Therefore, this is one of the advantages of the embodiment of the invention, where the risk score is adaptively updated as the user profile cluster is updated. In prior arts, this requires manual adjustment of the risk score calculation criteria. For example, the period of low risk log in time needs to be updated from (7:30 AM-8:30 AM) to (8:00 AM-9:00 AM). Without adjusting the risk score criteria, the new event may be treated as anomaly in prior arts.

Figure 4:
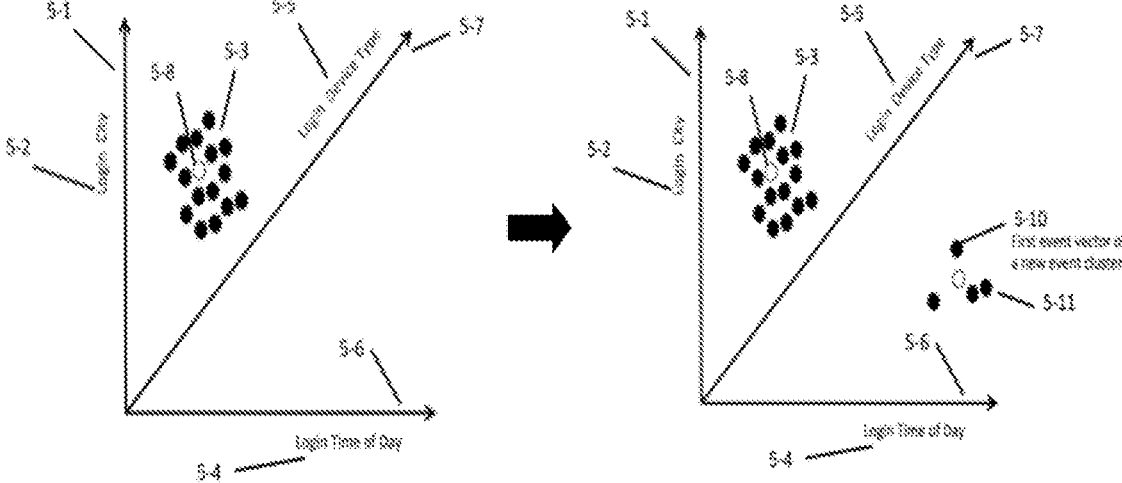
FIG. 4 is a diagram of an entity profile in form of two event clusters, and an anomaly event in form of an event vector.

FIG. 4 shows an entity profile evolves from a cluster 5-3 into two clusters. A new cluster 5-11 starts as an event vector 5-10, which is detected as anomaly and not part of the existing event cluster 5-3 by the well-known clustering algorithm. Therefore, additional factor for authentication is triggered for this entity. In general, using one factor for authentication is considered as a weak authentication method while using two or more factors for authentication is considered as a strong authentication method. In addition, for a single factor authentication, different types of factors used for authentication have different levels of authentication strength. In an embodiment of the invention, authentication using security questions (SQ) is considered very weak; authentication using password is considered weak to medium depending on the password rules enforced; authentication using Email or SMS or phone call is considered as medium; and one-time password (OTP) or authenticator or 3rd party radius (RSA) is considered strong.

In an embodiment of the invention, the additional factor for authentication is a strong factor for authentication than the default factor for authentication. Because the additional authentication is successful, which in turn is recorded as a new event and fed back into the Risk Assessment Engine 1-11, the event vector 5-10 is marked as the first event vector of the new cluster 5-11. This type of event cluster evolution typically happens when a user maintains more than one sets of assess patterns. For example, a user may regularly travel to another city for a week once a quarter. From the event cluster perspective, the user at least has two clusters, one centered at the home location while the other centered at the visiting location. The event cluster centered at the visiting location grows during the week when the user is traveling. When the user returns to home, the event cluster centered at the visiting location stops growing and eventually decays when the event data becomes outdated. In an embodiment of the invention, the event data that is stored longer than certain duration may get purged from the event cluster. When the user travels again, as the event cluster at the visiting location is already established, the computing process for risk assessment with sufficient level of confidence is accelerated.

Figure 5:
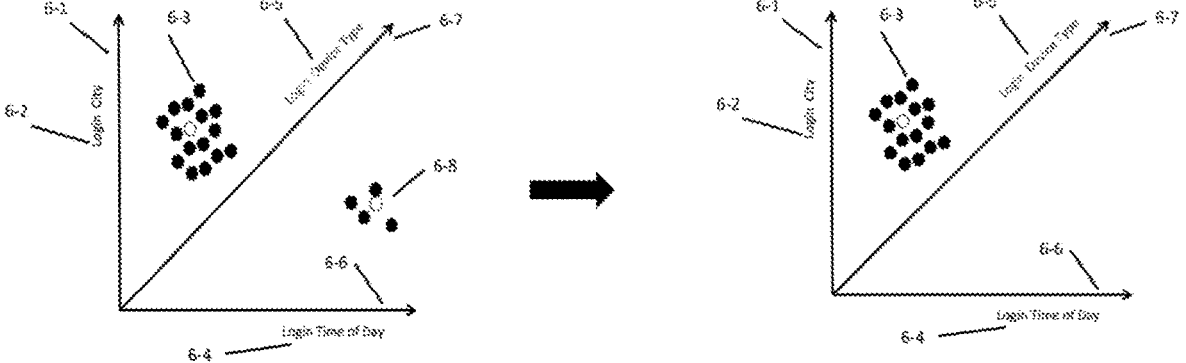
FIG. 5 is a diagram of an entity profile in form of two event clusters; one is a cluster with long-term memory while the other is a cluster with short-term memory. Clusters with short-term memory decay more quickly than clusters with long-term memory.

FIG. 5 shows a diagram of an entity profile in form of two event clusters 6-3 and 6-4. Cluster 6-3 is a cluster with long-term memory while cluster 6-8 is a cluster with short-term memory. The event cluster with long-term memory represents the entity's normal or routine behavior, which does not change or only gradually changes over a long period. For example, a user usually check work emails from his/her smartphone around 7 AM every morning at home for years. The event vectors of a long-term memory cluster are useful reference for the user's future routine behavior. Therefore, event vectors that belong to the event cluster with long-term memory are kept as part of the event cluster for a relatively long period, e.g., several months or years. In an embodiment of the invention, the event cluster with long-term memory is formed by well-known machine-learning clustering methods. On the other hand, the event cluster with short-term memory represents the entity's temporary behavior, which tends to change and only last for a short period. For example, a user travels for business regularly out of his/her home for a week once a month. During the week of travelling, a user's network access behavior such as network login location and login time is likely different from the behavior in past or future months. And, the user maintains such network access behavior only during the week of travelling. The event vectors collected in current travelling week may not be the right reference for the user's future behavior. Therefore, the event vectors of a short-term memory cluster are only kept as part of the event cluster for a relatively short period, e.g., several days. As a result, in an embodiment of the invention, an event vector cluster with short-term memory decays more quickly than an event vector cluster with long-term memory. In an embodiment of the invention, the event cluster with short-term memory is formed by rules such as multifactor authentication with strong authentication factors. In an embodiment of the invention, the rules are configurable by users that will result customized event clusters with short-term memory. FIG. 5 shows an example that the cluster 6-8 with short-term memory decays more quickly than the long-term memory cluster 6-3.

What is claimed is:

1. A non-transitory computer readable medium including instructions that, when executed by at least one processor, cause the at least one processor to perform operations for automatically evaluating and responding to network security risks, comprising:

building a customized behavioral profile for an identity using a machine-learning process;

determining event clusters associated with a long-term memory and a short-term memory based on the customized behavioral profile;

identifying a new event associated with the identity;

determining a risk level for the new event based on the customized behavioral profile for the identity;

accessing a set of security rules, wherein the security rules are based on the event clusters; and performing a security action based on the risk level and the security rules.

2. The non-transitory computer-readable medium of claim 1, wherein inputs to the machine-learning process include at least two of:

a login location, a login time, a number of login attempts, an identification of a login device, an IP address used for login, and an application used for login.

3. The non-transitory computer-readable medium of claim 1, wherein the customized behavioral profile for the identity is represented by a plurality of clusters of event vectors.

4. The non-transitory computer-readable medium of claim 1, wherein the risk level has an associated confidence level based on a training maturity of the machine learning process.

5. The non-transitory computer-readable medium of claim 1, wherein the security action comprises at least one of:

generating a prompt for authentication of the identity, generating an alert, and denying access by the identity to an access-restricted network resource.

6. The non-transitory computer-readable medium of claim 1, wherein the risk level is further based on a vector distance between an event vector and a center vector of the event clusters.

7. The non-transitory computer-readable medium of claim 1, wherein the operations further comprise an authentication based on the risk level.

8. The non-transitory computer-readable medium of claim 1, wherein the operations further comprise receiving an event report.

9. The non-transitory computer-readable medium of claim 1, wherein the operations further comprise receiving updates on activity of the identity and automatically updating the customized behavioral profile for the identity based on the updates.

10. The non-transitory computer-readable medium of claim 1, wherein the operations further comprise adjusting a confidence threshold based on feedback events associated with the identity.

11. A computer-implemented method for automatically evaluating and responding to network security risks, comprising:

building a customized behavioral profile for an identity using a machine-learning process;

determining event clusters associated with a long-term memory and a short-term memory based on the customized behavioral profile;

identifying a new event associated with the identity;

determining a risk level for the new event based on the customized behavioral profile for the identity;

accessing a set of security rules, wherein the security rules are based on the event clusters; and performing a security action based on the risk level and the security rules.

12. The computer-implemented method of claim 11, wherein determining the risk level includes determining whether the new event is part of a cluster of event vectors.

13. The computer-implemented method of claim 11, wherein the risk level comprises one of: unknown, normal, low risk, medium risk, or high risk.

14. The computer-implemented method of claim 13, further comprising sending an alert when the risk level is high risk.

15. The computer-implemented method of claim 11, further comprising applying a filter to exclude malformed or irrelevant inputs to the machine-learning process.

16. The computer-implemented method of claim 11, further comprising applying configurable risk assessment rules to determine the risk level.

17. The computer-implemented method of claim 11, wherein the set of security rules are pre-configured.

18. The computer-implemented method of claim 11, wherein the event clusters are dynamically updated.

19. The computer-implemented method of claim 11, wherein the long-term memory represents the identity's routine behavior and the short-term memory represents the identity's temporary behavior.

20. The computer-implemented method of claim 11, further comprising generating a display of the risk level.

* * * * *